United States Patent
Vaslin et al.

(10) Patent No.: US 10,738,871 B2
(45) Date of Patent: Aug. 11, 2020

(54) ROLLER PINIONS FOR DRIVING AN AIRCRAFT WHEEL IN ROTATION

(71) Applicant: SAFRAN LANDING SYSTEMS, Vélizy-Villacoublay (FR)

(72) Inventors: Jean-Philippe Vaslin, Le Chesnay (FR); Laurent Mallet, La Crau (FR); Frédéric Ivaldi, Carqueiranne (FR); Frédérik Giraud, Paris (FR); Mathieu Daffos, Issy-les-Moulineaux (FR)

(73) Assignee: SAFRAN LANDING SYSTEMS, Vélizy-Villacoublay (FR)

(*) Notice: Subject to any disclaimer, the term of this patent is extended or adjusted under 35 U.S.C. 154(b) by 239 days.

(21) Appl. No.: 15/939,121

(22) Filed: Mar. 28, 2018

(65) Prior Publication Data

US 2018/0283522 A1    Oct. 4, 2018

(30) Foreign Application Priority Data

Mar. 29, 2017    (FR) ...................................... 17 52633

(51) Int. Cl.
*F16H 55/14*    (2006.01)
*F16D 3/18*    (2006.01)
(Continued)

(52) U.S. Cl.
CPC ........... *F16H 55/14* (2013.01); *B64C 25/405* (2013.01); *F16D 3/185* (2013.01); *F16D 3/64* (2013.01);
(Continued)

(58) Field of Classification Search
CPC .. F16H 55/10; F16H 55/14; F16H 1/24; F16F 15/124; F16F 15/1245; F16F 15/126;
(Continued)

(56) References Cited

U.S. PATENT DOCUMENTS 5,113,713 A    5/1992    Isabelle et al.
5,927,149 A *  7/1999    Moody ................... F16H 55/14
                                                           464/89
(Continued)

FOREIGN PATENT DOCUMENTS

EP    0172922 A1 *  3/1986    ............. F16H 55/14

OTHER PUBLICATIONS

Machine Translation of EP 0172922, obtained Mar. 27, 2020.*
French Search Report, dated Nov. 27, 2017, issued in French Application No. 1752633, filed Mar. 29, 2017, 9 pages.

*Primary Examiner* — Richard W Ridley
*Assistant Examiner* — Brian J McGovern
(74) *Attorney, Agent, or Firm* — Christensen O'Connor Johnson Kindness PLLC

(57) ABSTRACT

A roller pinion for rotating about a central axis generally includes a core having an axial bore at its center for mounting on a drive shaft and recesses extending the length of the core. The recesses define faces with a plurality of regularly distributed sectors extending between them. The roller pinion also includes a cage associated with a plurality of rollers. The cage extends around the outer peripheral surface of the core, and presents, facing the outer peripheral surface of the core, a concentric spherical inner surface that faces the recesses of the core. Protuberances are provided that extend into the recesses. The protuberances have faces positioned parallel to and facing the faces of the recesses. Metal strips arranged in bundles with elastomer material interposed between the strips are inserted in a space between the respective faces of one recess in the core and one protuberance of the cage.

7 Claims, 4 Drawing Sheets

(51) Int. Cl.
*F16H 1/00* (2006.01)
*B64C 25/40* (2006.01)
*F16H 55/10* (2006.01)
*F16F 15/124* (2006.01)
*F16D 3/64* (2006.01)
*F16H 1/24* (2006.01)
*F16D 3/221* (2006.01)

(52) U.S. Cl.
CPC ........... *F16F 15/124* (2013.01); *F16H 1/006* (2013.01); *F16H 55/10* (2013.01); *F16D 3/221* (2013.01); *F16H 1/24* (2013.01)

(58) Field of Classification Search
CPC ................. F16F 15/1435; F16F 15/136; F16F 15/13469; F16F 15/13476; F16F 15/121; B64C 25/405; F16D 3/185; F16D 3/64; F16D 3/221
See application file for complete search history.

(56) References Cited

U.S. PATENT DOCUMENTS

| | | | |
|---|---|---|---|
| 9,121,452 B2* | 9/2015 | Leonard | F16D 3/80 |
| 2013/0022468 A1* | 1/2013 | Castell Martinez | F03D 1/0691 |
| | | | 416/170 R |
| 2016/0195167 A1 | 7/2016 | Hofmann | |
| 2016/0298695 A1* | 10/2016 | Parker | F16D 3/185 |

* cited by examiner

ROLLER PINIONS FOR DRIVING AN AIRCRAFT WHEEL IN ROTATION

BACKGROUND

Some conventional aircraft have landing gear provided with actuators for driving wheels in rotation, so as to enable the aircraft to move without using the aeroengines of the aircraft. Among the various solutions that have been envisaged, one consists in providing a drive actuator having a roller pinion at its outlet that is constrained to mesh with a toothed wheel secured to the rim of the aircraft wheel. Nevertheless, the deformation to which the wheel and the landing gear carrying the wheel are subjected during taxiing make it necessary to make provision for the position of the roller pinion to adapt both linearly and angularly relative to the wheel, and thus to incorporate elements in the drive train that are movable or deformable. This is particularly true if the drive actuator is designed to be movable between an engaged position in which the roller pinion meshes with the toothed wheel, and a disengaged position in which the roller pinion is spaced apart from the toothed wheel. In addition, it is necessary to provide a filter member between the roller pinion and the drive motor suitable for filtering torque jolts. The adapter elements and the filter elements constitute additional elements giving rise to additional crowding in a zone that is already very congested, and requiring additional maintenance.

SUMMARY

In some embodiments, this disclosure relates to a particularly compact arrangement of the transmission between the outlet shaft of the drive actuator and the roller pinion, including a filter element and adapter elements. In order to achieve this and/or other benefits, there is provided a roller pinion for rotating about a central axis and comprising: a core having an axial bore at its center for mounting the core on a drive shaft, the core presenting an outer peripheral surface that is spherical, and recesses extending over the entire length of the core defining faces parallel to the central axis with a plurality of regularly distributed sectors extending between them; a cage that carries the rollers and that extends around the core, and that presents, facing the outer peripheral surface of the core, a concentric spherical inner surface, and facing the recesses of the core, protuberances extending inside the recesses so as to present faces facing the faces of the recesses and parallel thereto; and metal strips arranged in bundles, each bundle being inserted in a space extending between facing faces of a recess in the core and a protuberance of the cage, each strip being covered in elastomer material.

Such an arrangement provides various possibilities for the cage to move relative to the core, in translation along the axis of rotation, or along radial axes, and also in rotation about radial axes. It also serves to filter transmission jolts around the axis of rotation as a result of the elastomer material deforming. These possibilities are all grouped together within the volume of the roller pinion, thus achieving an appreciable saving in space.

The facing spherical peripheral surfaces allow the cage to perform ball-joint movements relative to the core. In various particular embodiments: the space between the spherical peripheral surfaces may be filled with elastomer material so as to make it possible, in addition to ball-joint movement, for the cage to move axially or radially a little relative to the core; the facing spherical peripheral surfaces may be spaced apart by clearance that is small and the space between these surfaces may be filled with grease or lubricant to allow the cage to perform ball-joint movement freely relative to the core; and the space between the spherical peripheral surfaces may receive balls that are received in cavities in the cage and that run in ball races in the core extending in diametric planes containing the central axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
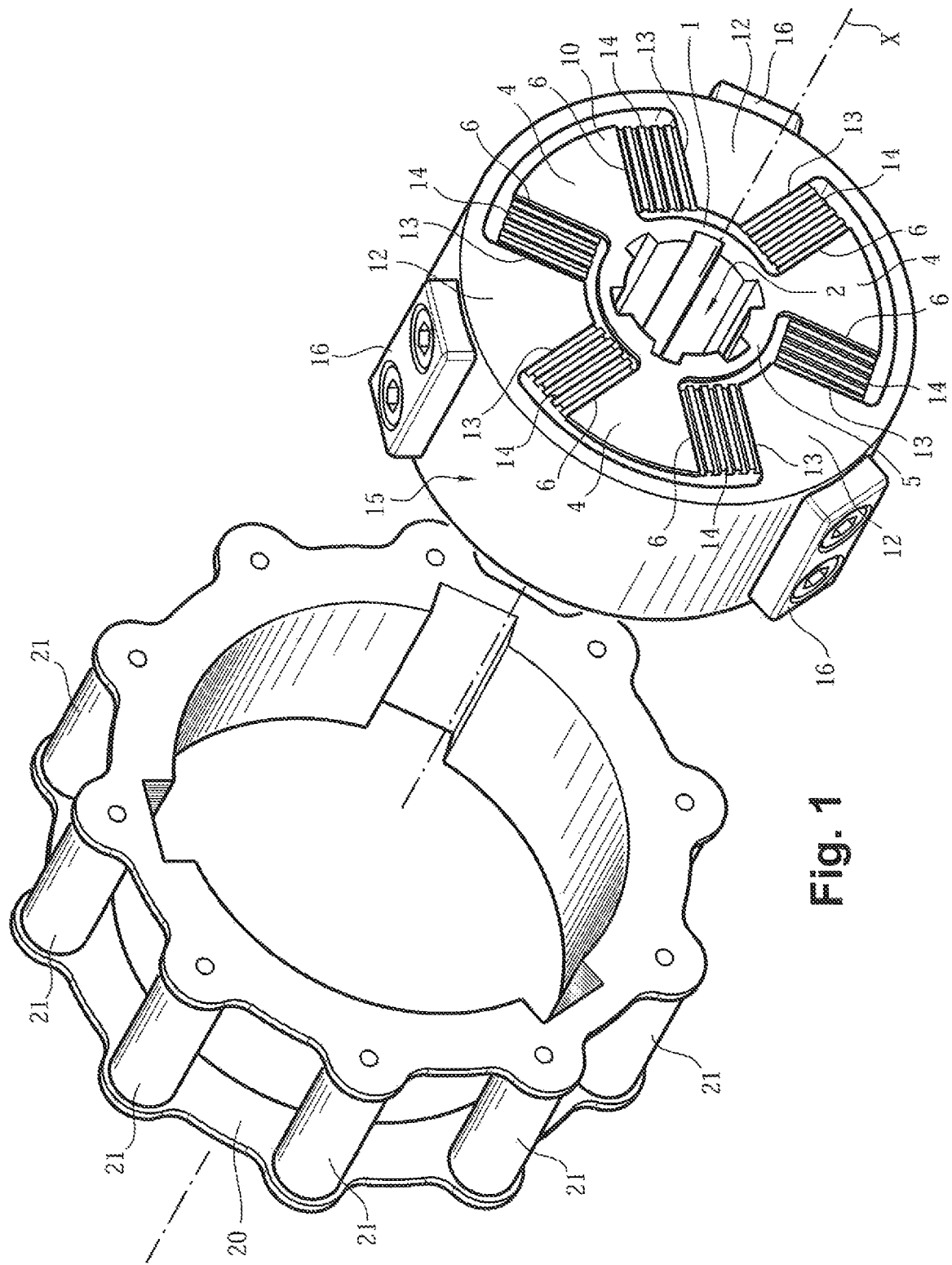
FIG. 1 is an exploded perspective view of a roller pinion in accordance with an aspect of the present disclosure.
Figure 2:
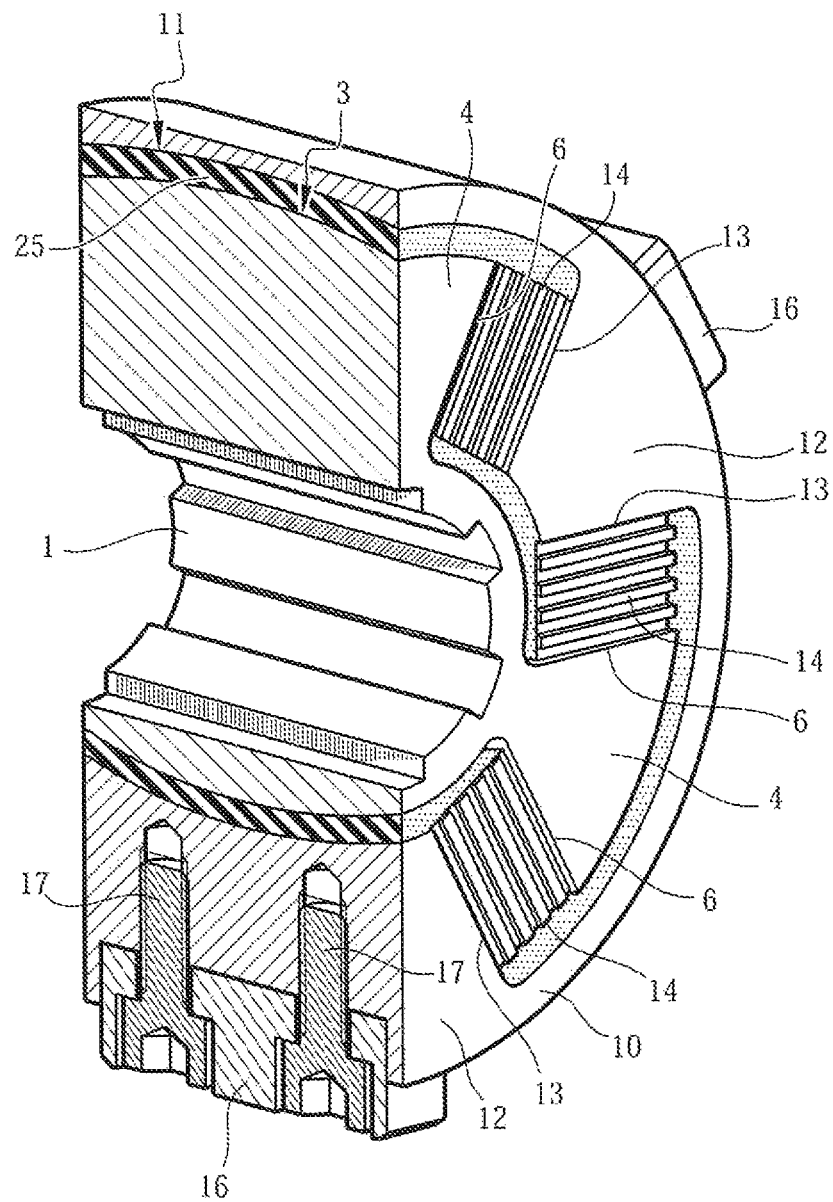
FIG. 2 is a cutaway view of the core and of the cage of the pinion of FIG. 1.

The following description provides several examples that relate to roller pinions for driving an aircraft wheel in rotation. With reference to FIGS. 1 and 2, the roller pinion of the present disclosure generally includes a core 1 that has a cylindrical bore 2 with a profile that is not circular (e.g., a fluted or keyed groove profile) for enabling the pinion to be mounted on a drive shaft (not shown) so that the central axis X of the core 1 coincides with the axis of rotation of the shaft. In some embodiments, the core 1 has an outer peripheral surface 3 that is spherical or partially spherical. In this example, the core 1 is made out of a block of metal having recesses are formed over the entire length of the core 1 so as to leave regularly spaced-apart sectors 4 that extend from a hub 5 to the outer peripheral surface 3. The sectors 4, and thus the recesses, are defined by plane faces 6 that are parallel to the central axis X. The roller pinion of the present disclosure also has a cage 10 that surrounds the core 1 and that presents a concentric spherical inner surface 11 facing the spherical outer peripheral surface 3 of the core 1.

Facing the recesses, the cage 10 has protuberances 12 that extend into the recesses in order to present faces 13 that face the faces of the recesses and that are parallel thereto. Each space extending between a face of a recess and a facing face of a protuberance 12 is occupied by a stack of metal strips 14, (having four strips per stack in the illustrated example), with elastomer material 25 being interposed between the strips 14 and also between the strips 14 and the facing faces 6 and 13 so as to form dampers serving to filter torque transmission jolts. In some embodiments, the entire empty space in the core 1 and the cage 10 is filled with elastomer material 25, thus allowing the cage 10 to shift relative to the core 1 along the central axis X and along radial axes. The configuration also allows for a small amount of angular pivoting about radial axes. Naturally, the characteristics of the elastomer material 25 may be selected so as to adjust the amplitude of these shifts and pivots. It should be observed that the space between the spherical peripheral surfaces in this example is made to be sufficiently large to enable the core 1 to be inserted into the cage 10 when assembling the assembly, prior to filling with the elastomer material 25.

In some embodiments disclosed herein, the cage 10 supports or carries the rollers by an outer peripheral surface 15 that is generally circularly cylindrical having obstacles 16 that are couplable to the cage 10 by a fastener, e.g., screws 17, that engage the protuberances 12. The outer peripheral surface 15 has an annular support 20 fitted thereon that carries the rollers 21. The obstacles serve to transmit torque between the cage 10 and the annular support 20. In some embodiments, the annular support 20 is held in place axially by any suitable feature, and the annular support 20 may be changed in order to replace the rollers 21 without requiring the entire pinion to be removed. In other embodiments, it may be decided to have the rollers 21 carried directly by the cage 10, omitting the annular support 20.

Figure 3:
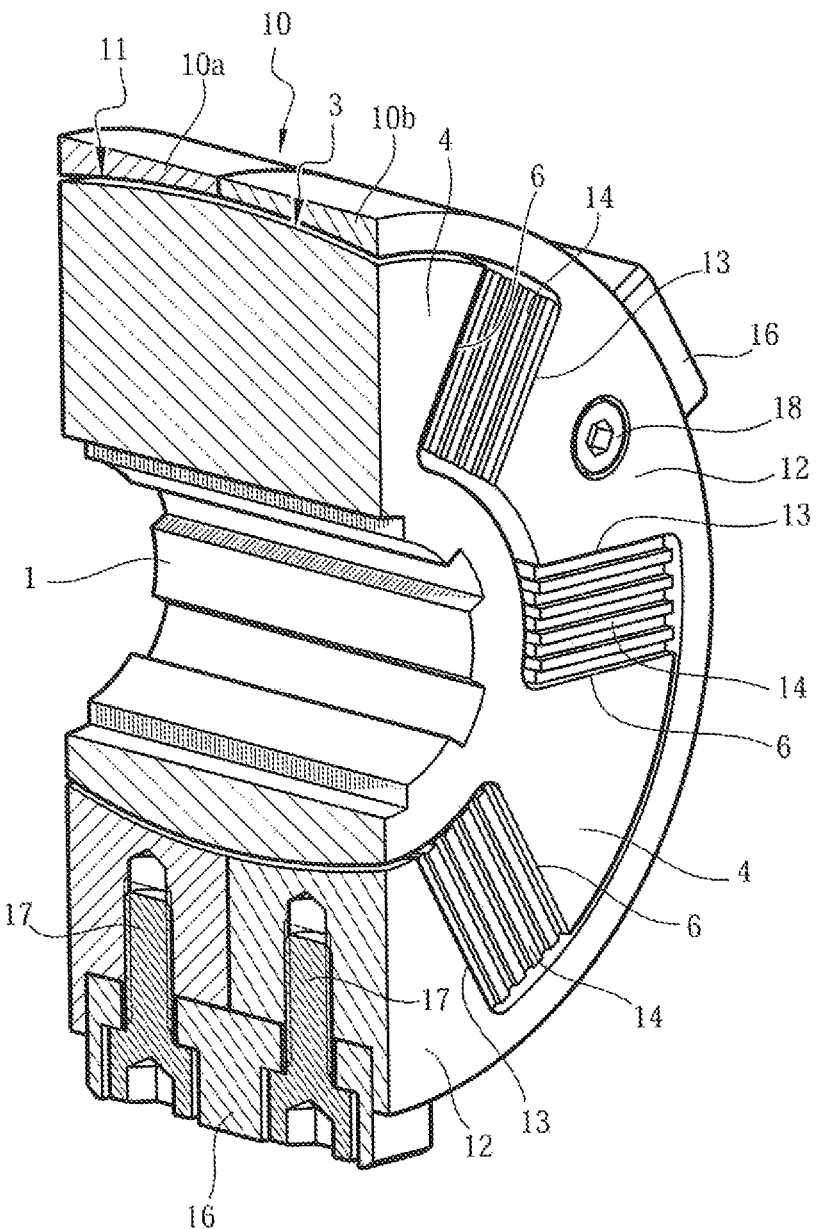
FIG. 3 is a view similar to FIG. 2 showing a ball-joint guidance between the cage and the core in accordance with another aspect of the present disclosure.

In another embodiment of the present disclosure, shown in FIG. 3, the connection between the core 1 and the cage 10 is a ball-joint connection made between the facing spherical surfaces 3 and 11. Given the small amount of clearance that needs to be allowed between the two surfaces 3 and 11 to achieve an effective ball-joint connection, the cage 10 can no longer be made as a single block, and it is thus split into a first half-cages 10a and a second half cage 10b, separated by a plane P normal to the central axis. In some embodiments, the first and second half-cages 10a and 10b are fitted around the core 1 and secured to each other, e.g., by assembly screws 18 extending parallel to the central axis X. In other embodiments, the first and second half-cages 10a and 10b are secured to each other solely by the screws 17 that assemble the obstacles 16 to the cage 10. In this illustrated example, the space between the facing spherical surfaces 3 and 11 is exaggerated for greater clarity. In practice, the clearances of the facing spherical surfaces 3 and 11 may be very small and may include grease or lubrication. The arrangement in FIG. 3 allows the cage 10 to perform ball-joint movements relative to the core 1, while limiting any axial and radial movements of the cage 10 relative to the core 1.

Figure 4:
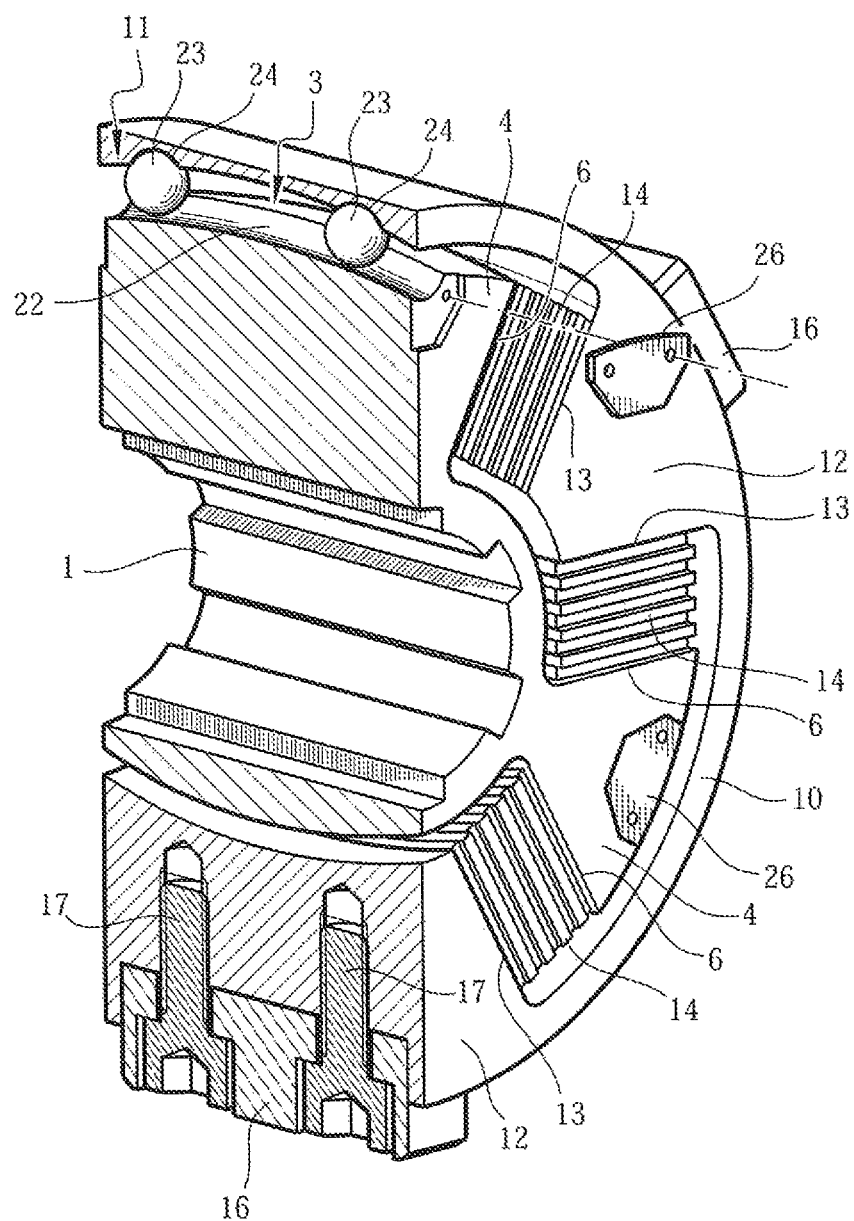
FIG. 4 is a view similar to the view of FIG. 3, showing guide balls arranged between the cage and the core in accordance with another aspect of the present disclosure.

In another embodiment of the present disclosure, shown in FIG. 4, the core 1 has ball races 22 formed in the outer peripheral surface with balls 23 running therein. The balls 23 are housed in cavities 24 formed in the inner peripheral surface 11 of the cage 10, such that the balls 23 are held stationary, apart from rolling within their respective cavities, relative to the cage 10. The ball races 22 are positioned in planes containing the central axis X. The ball races 22 are wider than the diameter of the balls 23 so as to allow the cage 10 to move angularly relative to the core about radial axes. In some embodiments, the ball races 22 preferably open out into the face of the core 1 and they are closed by covers 26 after the balls 23 have been put into place. In other embodiments, the ball races 22 do not open out, and the balls 23 are press fit. The assembly is greased to facilitate rolling of the balls 23. In a further embodiment, each ball race 22 is configured to receive only one ball 23.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A roller pinion for rotating about a central axis, comprising:
   a core having an axial bore at a center of the core for mounting the core on a drive shaft, the core having an outer peripheral surface that is spherical, and recesses extending over the entire length of the core, the recesses defining faces parallel to the central axis, with a plurality of regularly distributed sectors extending between the recesses;
   a cage supporting a plurality of rollers, the cage configured to extend around the outer peripheral surface of the core, forming a concentric spherical inner surface, wherein the cage includes protuberances extending into the recesses, the protuberances having faces positioned parallel to and facing the faces of the recesses; and
   a plurality of metal strips arranged in bundles with elastomer material interposed between the strips, each bundle being inserted in a space extending between the respective faces of one recess in the core and one protuberance of the cage.

2. The roller pinion of claim 1, wherein the rollers are carried by an annular support that is fitted onto an outer peripheral surface of the cage.

3. The roller pinion of claim 1, wherein the peripheral outer surface of the core and the concentric spherical inner surface of the cage define a free space filled with elastomer material.

4. The roller pinion of claim 1, wherein the peripheral outer surface of the core and the concentric spherical inner surface of the cage extend facing each other with operating clearance suitable for providing a ball-joint connection between the core and the cage.

5. The roller pinion of claim 4, wherein the cage is split into two half-cages that are assembled together on a plane normal to the central axis.

6. The roller pinion of claim 1, wherein balls are interposed between the core and the cage.

7. The roller pinion of claim 6, wherein the balls extend firstly in cavities formed in the cage, and secondly in ball races formed in the core.

\* \* \* \* \*